Dec. 12, 1967  P. O. L. GUSTAFSSON ET AL  3,357,509
STEERING DEVICE FOR A TRACK LAYING VEHICLE
Filed Oct. 18, 1965  3 Sheets-Sheet 1

INVENTORS
PER OLLE LENNART GUSTAFSSON
ERIK ARNE BERGLING
BY
Hane and Nydick
ATTORNEYS INVENTORS
PER OLLE LENNART GUSTAFSSON
ERIK ARNE BERGLING
BY Hane and Nydick
ATTORNEYS INVENTORS
PER OLLE LENNART GUSTAFSSON
ERIK ARNE BERGLING
BY Hane and Huplick
ATTORNEYS

United States Patent Office 3,357,509
Patented Dec. 12, 1967

3,357,509
STEERING DEVICE FOR A TRACK LAYING VEHICLE
Per Olle Lennart Gustafsson and Erik Arne Bergling, Karlskoga, Sweden, assignors to Aktiebolaget Bofors, Bofors, Sweden, a corporation of Sweden
Filed Oct. 18, 1965, Ser. No. 497,232
Claims priority, application Sweden, Dec. 3, 1964, 14,600/64
3 Claims. (Cl. 180—6.44)

ABSTRACT OF THE DISCLOSURE

A track-laying vehicle such as a combat vehicle, the steering system of which in forward and reverse direction is controlled by selectively operating track brakes and clutches of the vehicle. An auxiliary drive superimposes an auxiliary driving force upon the main driving force for the tracks to obtain a more effective braking and turning action. The steering system provides an automatic reversal of the turning movement of the vehicle in response to a steering action when the vehicle is driven in reverse, so that the steering movements to be taken by the operator when steering the vehicle are the same in both directions of movement of the vehicle.

---

The present invention relates to a steering device for a track laying vehicle. More particularly, the invention relates to a steering device which provides for steering of the vehicle by the combined action of a main driving means and an auxiliary drive means. The main drive means is controlled by a main control means for each track, each of which main control means includes a clutch and a brake between the respective track and the main drive means. Steering of the vehicle is effected by braking one of the tracks, preferably after uncoupling the same from the main drive means, but not the other track. As it is evident, such one-sided braking will cause turning of the vehicle into the desired direction. The auxiliary drive means are controlled by auxiliary control means by means of which an additive steering force at one track and a subtractive steering force at the other track can be superimposed upon the main driving force. The use of such superimposed steering forces permits a more accurate turning control than is obtainable with the main drive means and the main control means therefor.

Steering devices of the general kind above referred to are particularly suitable for use with military assault vehicles, such as armored tanks and more fully described in co-pending application Ser. No. 480,661, filed Aug. 18, 1965, and assigned to the same assignee as the present application.

The afore-referred to main control means and auxiliary control means are both operable by a common control member which, in accordance with the aforementioned pending application, may be so arranged that an initial operation of the control member activates the auxiliary control means and a continued operation activates the main control means.

While the hereinbefore outlined control system has been found to be highly successful for controlling of the vehicle during forward drive of the same, it does present difficulties when it is to be also used during driving of the vehicle in reverse. As it is apparent from an analysis of the control system as previously outlined in the present application and as is more fully described in application Ser. No. 480,661, the steering functions imparted by the auxiliary drive and the control means to a vehicle which is driven in reverse, are not fully compatible with the steering forces imposed by the main drive and control means upon the vehicle. Obviously any incompatibilities in the steering functions acting upon the vehicle makes driving thereof in reverse quite difficult.

It is a broad object of the present invention to provide a novel and improved steering system of the general kind above referred to with which the vehicle can be conveniently and accurately steered in forward direction and reverse direction.

It is a more specific object of the invention to provide a novel and improved steering device of the general kind above referred to with which the vehicle can be steered without difficulty in both driving directions by operating a control member common to the clutch and brake controlled steering means and to the auxiliary steering means acting by producing the additive and subtractive steering forces.

The aforepointed out objects, features and advantages of the invention and other objects, features and advantages are attained with a combination steering device of the general kind above referred to and more fully described in application Ser. No. 480,661 by directionally reversing the steering forces applied to the vehicle and more specifically to the tracks thereof when the vehicle is driven in reverse. In other words, a steering force which would be applied to the right hand track when the vehicle is driven forward will be applied to the left hand track when the vehicle is driven in reverse.

To obtain such reversal of the steering functions a hydraulic control system including a control valve may be provided. This valve may be controlled by the control assembly so that the hydraulic control system acts upon the tracks in reversed fashion when the driving direction of the vehicle is reversed.

The invention will be more fully described in connection with the accompanying drawing in which several preferred embodiments of the invention are shown by way of illustration and not by way of limitation.

Figure 1:
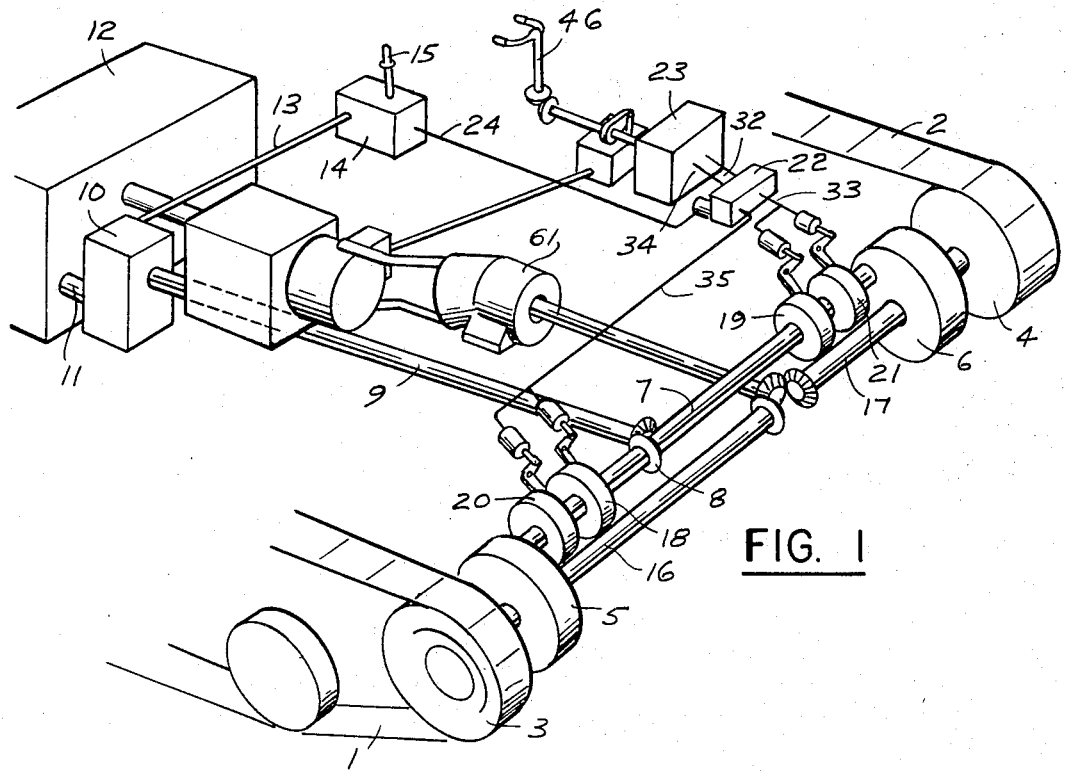
FIG. 1 is a perspective diagrammatic view of a steering device according to the invention for a track laying vehicle.

Referring first to FIG. 1, this figure shows diagrammatically the tracks 1 and 2 of a track laying vehicle which is not illustrated and may be visualized as being conventional. The tracks are driven by wheels 3 and 4 coupled to gearings 5 and 6. The driving power is supplied to the gearings and thus to drive wheels 3 and 4 by a shaft 7 which, in turn, is driven via a bevel gearing 8 by a drive shaft 9 coupled via a gearing 10 to a main drive shaft 11 of a motor 12 of conventional design. Gearing 10 is coupled by a shaft 13 to a gear shift 14, controllable by a gear shift lever 15 in a conventional and well understood manner. It suffices to state that by appropriately setting lever 15 the tracks of the vehicle drive the same either in forward direction or in reverse direction.

Steering of the vehicle is effected in part by an auxiliary steering mechanism arranged to supply an additive driving force either to gearing 5 or gearing 6 and a subtractive driving force to the respective other one of the two gearings. As it is evident, the application of an additive driving force to gearing 5 superimposed upon the driving force supplied to this gearing via shaft 7 in conjunction with the application of a subtractive driving force to gearing 6 and superimposed to the main driving force applied thereto by shaft 7 will cause the vehicle to make a left turn, assuming that driving wheels 3 and 4 are at the forward end of the vehicle and the same is driven in forward direction. The other part of the steering force is supplied to the vehicle by means of a normally engaged steering clutch 18 and a normally disengaged steering brake 20 coacting with gearing 5 and a normally engaged steering clutch 19 and a normally disengaged steering brake 21 coacting with gearing 6. Both clutches and both brakes are included in drive shaft 7. As it is evident, disengagement of the drive shaft from gearing 6 by releasing clutch 19 and applying brake 21 while leaving clutch 18 engaged and brake 20 disengaged will cause a slewing of the vehicle towards the left under the conditions previously stated in connection with the auxiliary steering means.

Such clutch-brake steering means and auxiliary steering means functioning by superimposition of driving forces are fully described in the aforementioned prior pending application Ser. No. 480,661.

The steering device according to the present invention comprises a reversal control valve 22 to which is supplied steering control fluid by a steering control valve 23 which constitutes part of the afore-referred to combined steering system. The valve 22 which will be more fully described hereinafter is coupled by a suitable transmission means 24 with gear shift 14 so that valve 22 is moved from one operational position to another operational position when gear shift lever 15 is shifted from neutral or forward drive to reverse drive.

Figure 2:
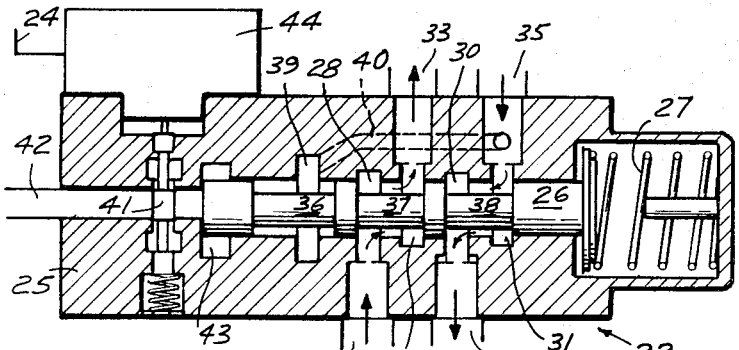
FIG. 2 is a diagrammatic sectional view of a reversal control valve included in the steering devices.
Figure 3:
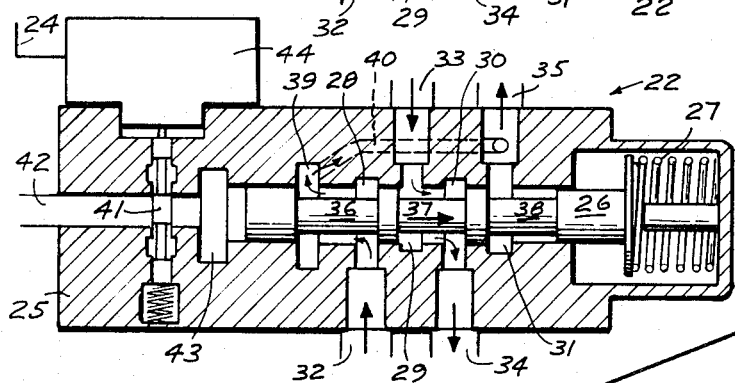
FIG. 3 is a sectional view similar to FIG. 2 but showing the valve in a different operational position.

Turning now to FIGS. 2 and 3, valve 22 as exemplified in these figures comprises a valve housing 25 in which a valve member or slide 26 is lengthwise slidable. A loaded coil spring 27 biases valve member 26 toward the left as shown in the figures. The valve housing includes annular valve chambers 28, 29, 30 and 31 surrounding valve member 26. Chamber 28 is connected to a pipe 32, chamber 29 to a pipe 33, chamber 30 to a pipe 34 and chamber 31 to a pipe 35. Pipes 32 and 34 lead to steering control valve 23 while pipes 33 and 35 are connected to diagrammatically indicated hydraulic control units for the clutches and brakes for the left and the right track of the vehicle. The hydraulic control units and the clutches and brakes are not described in detail. It suffices to state that the two clutches are normally engaged unless the respective hydraulic unit is operated and that the brakes are normally disengaged unless the respective hydraulic unit is operated. Any hydraulic control of this kind is more fully described in the aforementioned application, Ser. No. 480,661.

Valve member 26 has three lengthwise spaced circumferential recesses 36, 37 and 38 which are so correlated with the housing chambers and the pipes connected thereto that pipe 32 is connected to pipe 33 and pipe 34 to pipe 35 when the valve member is in the position into which it is biased by the action of spring 27. This position is shown in FIG. 2.

A displacement of the valve member against the action of spring 27 connects pipe 32 with a further annular chamber 39 in the valve housing. This chamber is connected by a duct 40 to pipe 35. Moreover, pipe 33 is connected by chamber 29 through recess 37 and chamber 30 with pipe 34. The just described position of the valve member is shown in FIG. 3.

The valve member can be displaced from the position of FIG. 2 into the position of FIG. 3 by a servo-valve 41 which controls the flow of a suitable pressure fluid, such as oil, through a supply line 42 to a further valve chamber 43 in which is exposed the end face of valve member 26 opposite to the one against which spring 27 acts. Valve 41 is controllable in a conventional manner, for instance, by a solenoid 44 connected to a control circuit indicated at 24 and leading to lever 15.

The steering device as hereinbefore described operates as follows:

Let it be assumed that gear shift lever 15 is set for forward drive and a left turn is intended. Valve member 26 of valve 22 is then in the position of FIG. 2 in which a pressure fluid fed by steering control valve 23 to pipe 32 flows into pipe 33. Steering of the vehicle may now be effected by activating clutch 19 and brake 21 associated with track 2 as has been described in the aforementioned prior application 480,661.

Let it now be assumed that gear shift lever 15 is set in its reverse position. The solenoid 44 is then energized via control circuit 24 so that servo-valve 41 is moved into a position in which pressurized oil is fed to supply line 42 thereby causing displacement of valve member 26 from the position of FIG. 2 into the position of FIG. 3. As a result, the fluid pressure incoming through pipe 32 is fed through housing chamber 28, recess 36, housing chamber 39 and duct 40 to pipe 35. As a result, pressure fluid fed from steering control valve 23, which causes activation of clutch 18 and brake 20 in the position of lever 15 for forward drive, now causes activation of clutch 19 and brake 21.

Accordingly, the auxiliary steering means functioning by superimposing steering forces and which, without the arrangement of the invention, causes during reverse drive steering functions that are opposite to those produced during forward drive, can now cooperate with a clutch-brake steering control as described. In other words, irrespective whether the vehicle is steered by means of the auxiliary steering system or the clutch-brake steering system, a turning of the vehicle in the same direction in response to a corresponding turning of a steering control member 46 will be obtained.

Figure 4:
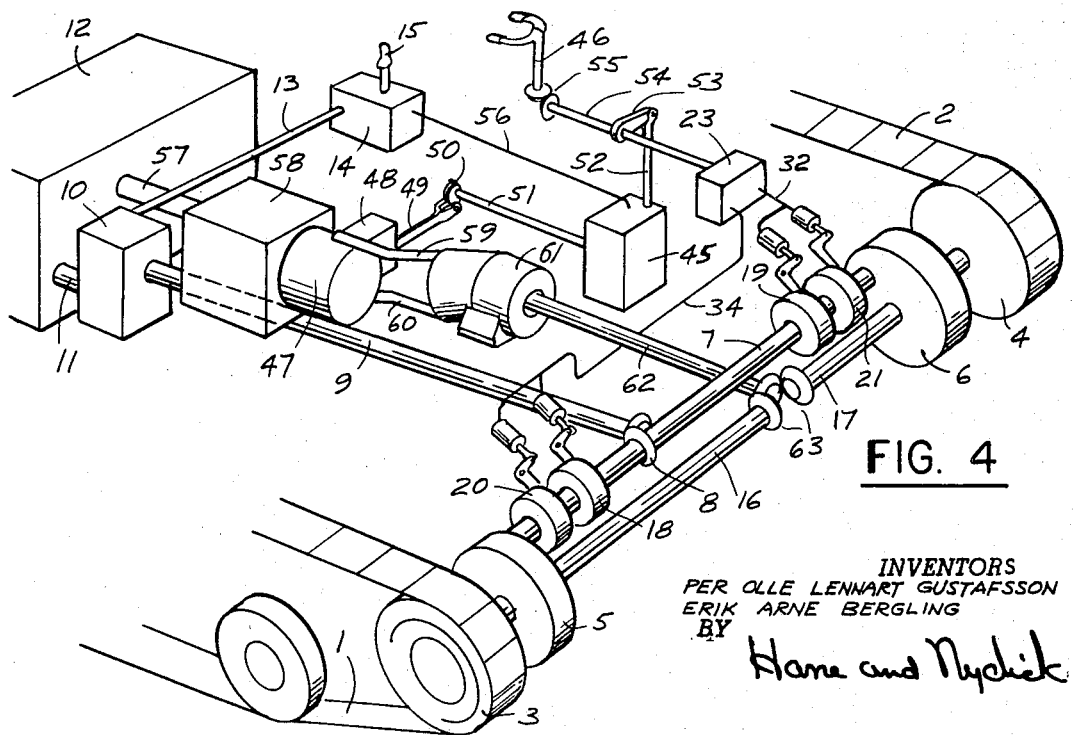
FIG. 4 is a diagrammatic perspective view of a modification of the steering device according to the invention.

The exemplification of the invention as shown in FIG. 4 is distinguished from the one according to FIG. 2 in that reversal control valve 22 is eliminated and instead a transmission means 45 transmits the setting of control member 46 to a control valve 48 coacting with the pump part 47 of a hydraulic power system having a motor part 61. Control valve 48 is coupled by a rod 49 and a pivotal link 50 to one end of a rotatable shaft 51, the other end of which is connected to transmission means 45. This transmission means is coupled to a rod 52 which is connected via a pivotal link 53, a shaft 54 and a bevel gearing 55 to control member 46 so that control movements of the control member are transmitted to transmission means 45 which is further connected by a suitable transmission 56 to the gear shift 14 and gear shift lever 15. The pump part 47 of the hydraulic power system is driven by a motor 12 via a shaft 57 and a gearing 58 and is connected to a motor part 61 of the system by pipes 59 and 60. The motor part feeds the auxiliary driving force, that is, additive and subtractive forces respectively to shafts 16 and 17 via a shaft 62 and bevel gearing 63 as has been described in connection with aforementioned pending application 480,661.

Transmission means 45 will now be described in detail in connection with FIGS. 5, 6, 7 and 8. Rod 52 connecting the transmission means 45 with control member 46 as previously described controls, by means of a pivot pin 64, the position of a T-shaped lever 65, one arm of which is pivotal about a stationarily mounted pivot pin 66. Lever 65 controls the position of slide 67 which is slidable in tracks 68 and 69. The slide includes a curved control slot 70 in which is guided a sliding block or pin 71. The shape of the slot is such that it imparts to sliding pin 71 a so-called progressive guidance, that is, movement of control member 46 through a first distance out of a neutral position (such as the position shown in FIG. 4) produces a considerably smaller steering action than a movement of control member 46 through the same distance but starting from a position further remote from the neutral position, such as a movement of the control member is continuation of the first movement. As a result, a highly accurate steering control of the vehicle can be obtained. Such an accurate control is of particular importance when the steering device is used on a weapon carrier such as a tank mounting a gun which must be trained in traverse by turning the entire vehicle. A steering device of this kind is more fully described in co-pending application Ser. No. 452,733, filed May 3, 1965, and assigned to the same assignee as the present application.

Figure 5:
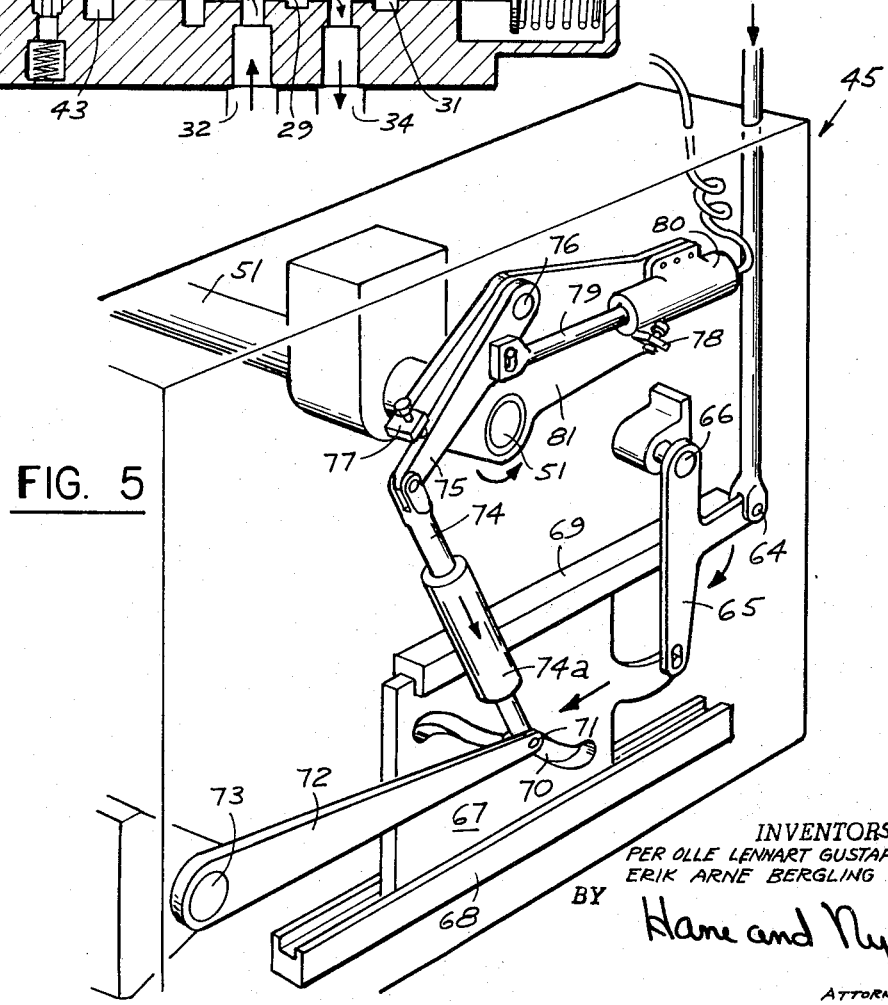
FIG. 5 is a perspective diagrammatic view of a reversal control assembly included in the steering device according to FIG. 4.
Figure 6:
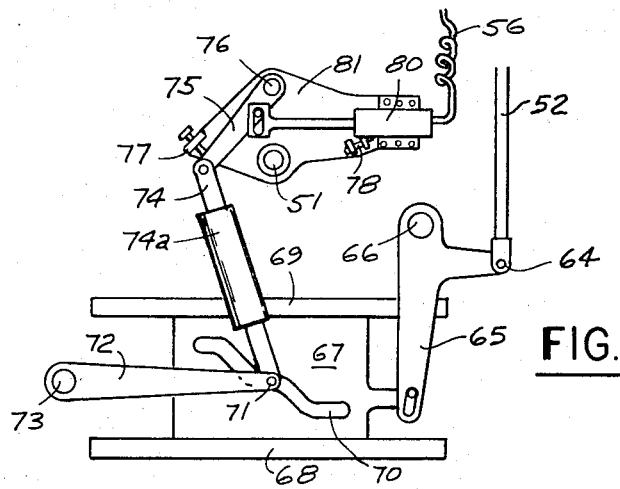
FIGS. 6 through 8 show diagrammatically different operational positions of the reversal control assembly according to FIG. 5.
Figure 7:
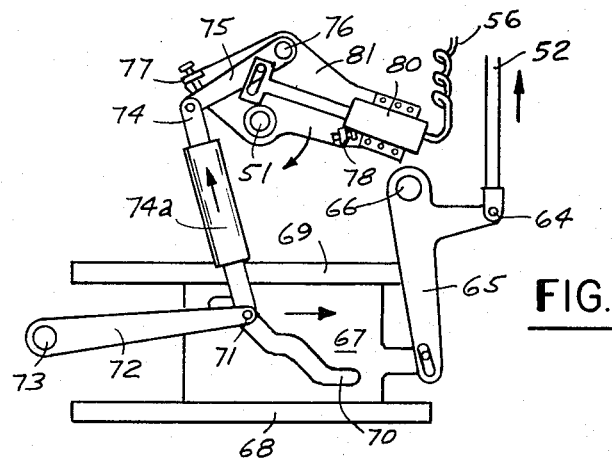

Sliding block or pin 71 supports one end of an arm, the other end is pivotal about a stationarily mounted pivot pin 73. Sliding pin 71 further supports a lever 74 which may include a buffer 74a of conventional design, such as a spring loaded buffer. The free end of an arm 74 is pivoted to a lever 75 which is pivotal about a pivot pin 76. The lever 75 is pivotal between two end stops 77 and 78. As is shown, the two end stops are disposed on opposite sides of the rotational axis of shaft 51. Its position, with respect to the limit positions, is controlled by a piston rod 79 of a piston (not shown) slidable in the cylinder of a hydraulic piston-cylinder servomotor 80. The cylinder of the motor is connected to a pipe 56 for feeding pressure fluid to the hydraulic servomotor. If no such fluid is fed through pipe 56, lever 75 is pressed by piston rod 79 into its limit position abutting against stop 77. This position is shown in FIGS. 5, 6 and 7.

Figure 8:
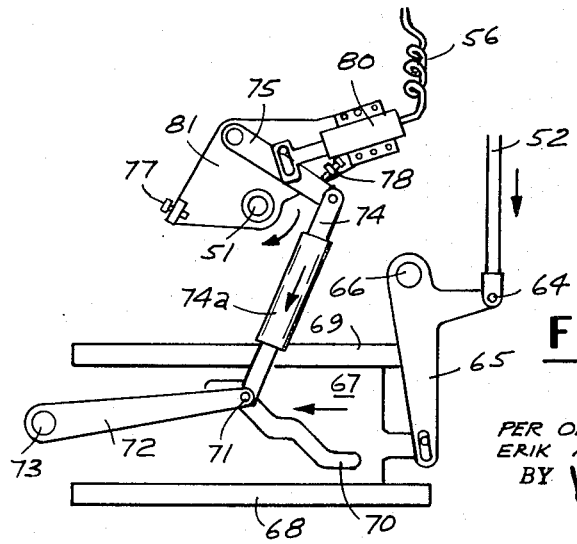

If and when pressure fluid is fed through pipe 56 to hydraulic servomotor 80, lever 75 is pivoted in the just described position into its other limit position in which it abuts against limit stop 78. This position of lever 75 is shown in FIG. 8.

Pivot 76, limit stops 77 and 78 and hydraulic servomotor 80 are fixedly secured on a plate-shaped control member 81 which, in turn, is fixedly secured on shaft 51.

The steering device described in FIGS. 4 through 8 operates as follows:

Let it be first assumed that the vehicle is driven in forward direction. Lever 75 will then occupy the position shown in FIGS. 5, 6 and 7 in which the lever abuts against limit stop 77. A control movement initiated by means of control members 46 in the direction of the respective arrow in FIG. 5 will impart to rod 52 a lengthwise displacement which causes, via T-shaped lever 65, a movement of slide 67 in the direction toward pivot pin 73. As a result, arm 74 obtains a corresponding movement via pin 71 sliding in slot 70 and plate 81 together with shaft 51 is turned in counterclockwise direction as it is also indicated by an arrow in FIG. 5. Rod 49, coupled to shaft 51 by link 50, obtains a movement of the control valve 48 of pump part 57 thus causing a pivoting of a pivotal member (not shown) in pump part 47. Pressure fluid is now supplied through pipes 59 and 60 so that motor part 61 will turn shaft 62. Such turning of shaft 62 produces oppositely directed rotations of shafts 16 and 17 which are superimposed in gearings 5 and 6 to the driving forces supplied to these gearings by shaft 7.

In the event control member 46 is actuated to effect a left turn of the vehicle, shaft 17 will turn in a rotational direction opposing the normal driving direction of the vehicle, that is, shaft 17 will superimpose a subtractive auxiliary driving force while the rotational direction of shaft 16 is such that it coincides with the normal driving direction, that is, shaft 16 will superimpose an additive driving force. In other words, the speed with which track 2 is actually driven is lower than the momentary normal driving speed of the track while track 1 is driven at a higher speed than is normal, thereby causing the desired left turn of the vehicle as it is readily apparent. In the event a further control movement is given to control member 46, control valve 23 is activated and feeds a control fluid through pipe 32. This fluid feed will release clutch 17 and cause engagement of brake 21, thereby producing an amplified turning force for a left turn of the vehicle as has been more fully described in application Ser. No. 480,661.

In the event control member 46 is turned in the direction opposite to the one previously described, the transmission means 45 is activated as shown in FIG. 7 and the vehicle will make a right turn in a manner which is readily apparent from the previous specification.

Let it now be assumed that it is desired to drive the vehicle in reverse. For this purpose, gear shift lever 15 is appropriately set and pressure fluid will now be fed through pipe 56. As a result, lever 75 in transmission means 45 is now, by the action of hydraulic servomotor 80 and its piston rod 79, so pivoted that lever 75 abuts against limit stop 78 as it is shown in FIG. 8. In this position of lever 75, a displacement of rod 52 also causes a rotation of shaft 51 in the same manner as previously described, that is, via pivot pin 64, T-shaped lever 65, arm 74, lever 75 and plate 81, but the rotation of shaft 51 will now be in opposite direction, that is, in clockwise direction. Hence, a control movement of control member 46 which results in a left turn produces during backing up of the vehicle a turning of shaft 62 in the direction opposite to the one previously described. Hence, shaft 17 will now produce an additive driving force and shaft 16 a subtractive driving force in reference to the forward or normal driving direction of the vehicle. In other words, during driving in the reverse direction, the action of shaft 17 results in a reduced rotational speed of driving wheel 4 and thus of track 2 and similarly the rotation of shaft 16 imparts to track 1 an increased speed. Accordingly, the reversed rotational direction of shaft 62 produces a turning of the vehicle while being driven in reverse in the same direction as the vehicle is turned while being driven forward. Similarly, the clutch-brake steering system which is controlled by valve 23, coacting with the steering system, produces steering forces in the same manner as it does during forward drive of the vehicle.

The steering device as exemplified in FIG. 4 and the companion figures causes movement of the vehicle when reversed along substantially the same track along which it has travelled when driven forwardly provided, of course, that control member 46 is set in the same manner. With the steering system as exemplified in FIG. 1 and the companion figures, an operation of control member 46 in the same manner for forward drive and reverse drive will cause turning of the vehicle during reverse drive in a direction opposite to the one in which the vehicle had turned while being driven in forward direction.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A steering device for a track laying vehicles having two tracks, said device comprising:
   a main drive means drivingly coupled with both tracks of said vehicle for driving both said tracks with a uniform main driving force;
   a main control means for each of said tracks, each of the main control means including a clutch means interposed between the respective track and said main drive means and a brake means interposed between the respective clutch means and said main drive means to effect turning of the vehicle into a desired direction by controlling said clutch means and said brake means;
   auxiliary drive means coacting with said main drive means for superimposing to said main driving force an additive auxiliary driving force at one track and a subtractive auxiliary driving force at the other track to effect turning of the vehicle into the desired direction;

auxiliary control means coacting with said auxiliary drive means for controlling the same, said auxiliary control means comprising a control valve including a movable valve member, the position of said valve member controlling the superimposition of said auxiliary driving force upon the main driving force;

directional shift means operable for shifting the driving direction of the tracks from forward to reverse and vice versa; and transmission means coupled to said control valve for controlling the position of the valve member thereof and also coupled to said directional shift means for controlling the transmission means by the setting of said shift means, said transmission means including a reversal linkage means for reversing the direction of the transmitted auxiliary driving force when said shift means is shifted from forward drive to reverse drive, said linkage means including a rotatable control shaft, the angular position of said shaft controlling the position of said movable valve member so that said auxiliary control means reverses its control functions upon turning of said shaft from one predetermined angular position into another predetermined angular position; a control member fixedly secured to said control shaft for turning in unison with the same, and coupling means coupling said shift means with said control member for turning the latter and with it the control shaft through said one predetermined angle upon setting the shift means for forward drive and through said other predetermined angle upon setting the shift means for drive in reverse.

2. A steering device according to claim 1, wherein said coupling means comprise a lever hinged at one end to said control member and pivotal between two limit positions, a lengthwise displaceable control rod coupled to said lever and also coupled to said shift means, setting of the shift means for drive in one direction displacing said rod in one direction and setting of the shift means for drive in the other direction displacing said rod in the opposite direction, displacement of the rod in said one direction pivoting said lever into one limit position and displacement of the rod in said opposite direction pivoting said lever into the other limit position, placement of the lever in said one limit position causing turning of the control member and with it of the control shaft through said one predetermined angle and placement of the lever in said other limit position causing turning of the control member and with it of the control shaft through said other predetermined angle.

3. A steering device according to claim 2, wherein said limit positions of the control lever are disposed on opposite sides of the rotational axis of said control shaft to effect turning thereof in opposite directions upon pivoting of the control lever from one limit position into the other limit position.

References Cited
UNITED STATES PATENTS

| | | | |
|---|---|---|---|
| 1,797,797 | 3/1931 | Saives | 74—720.5 X |
| 2,004,929 | 6/1935 | Centervall | 180—6.44 X |
| 2,712,370 | 7/1955 | Westfall | 192—13 |
| 2,961,057 | 11/1960 | Johnson | 180—6.2 |

BENJAMIN HERSH, *Primary Examiner.*

J. A. PEKAR, *Assistant Examiner.*